United States Patent
Stanjek et al.

(10) Patent No.: US 9,920,229 B2
(45) Date of Patent: Mar. 20, 2018

(54) CROSS-LINKABLE MASSES BASED ON ORGANYL-OXYSILANE-TERMINATED POLYMERS

(71) Applicant: Wacker Chemie AG, Munich (DE)

(72) Inventors: Volker Stanjek, Ampfing (DE); Lars Zander, Altoetting (DE)

(73) Assignee: WACKER CHEMIE AG, Munich (DE)

( * ) Notice: Subject to any disclaimer, the term of this patent is extended or adjusted under 35 U.S.C. 154(b) by 0 days.

(21) Appl. No.: 14/904,876

(22) PCT Filed: Aug. 5, 2014

(86) PCT No.: PCT/EP2014/066824
§ 371 (c)(1),
(2) Date: Jan. 13, 2016

(87) PCT Pub. No.: WO2015/024773
PCT Pub. Date: Feb. 26, 2015

(65) Prior Publication Data
US 2016/0160103 A1    Jun. 9, 2016

(30) Foreign Application Priority Data
Aug. 23, 2013 (DE) .................. 10 2013 216 852

(51) Int. Cl.
| | | |
|---|---|---|
| C09J 183/16 | (2006.01) |
| C08K 5/105 | (2006.01) |
| C08K 5/12 | (2006.01) |
| C08G 65/336 | (2006.01) |
| C09J 171/02 | (2006.01) |
| C08G 18/71 | (2006.01) |
| C08G 18/28 | (2006.01) |
| C08G 77/54 | (2006.01) |
| C09J 5/00 | (2006.01) |
| C08L 71/02 | (2006.01) |
| C09K 3/10 | (2006.01) |

(52) U.S. Cl.
CPC .......... *C09J 183/16* (2013.01); *C08G 18/283* (2013.01); *C08G 18/718* (2013.01); *C08G 65/336* (2013.01); *C08G 77/54* (2013.01); *C08K 5/105* (2013.01); *C08K 5/12* (2013.01); *C08L 71/02* (2013.01); *C09J 5/00* (2013.01); *C09J 171/02* (2013.01); *C09J 2471/00* (2013.01); *C09K 2003/1056* (2013.01)

(58) Field of Classification Search
None
See application file for complete search history.

(56) References Cited

U.S. PATENT DOCUMENTS

| | | | |
|---|---|---|---|
| 7,319,128 B2 | 1/2008 | Ziche et al. | |
| 8,067,508 B2 | 11/2011 | Braun et al. | |
| 8,101,704 B2 | 1/2012 | Baumann et al. | |
| 8,563,675 B2* | 10/2013 | Zander ............ | C08G 65/33351 525/474 |
| 2007/0287780 A1* | 12/2007 | Wakabayashi ....... | C08G 65/336 524/188 |
| 2009/0088523 A1 | 4/2009 | Ono | |

FOREIGN PATENT DOCUMENTS

| | | |
|---|---|---|
| DE | 10 2011 006 128 A1 | 9/2012 |
| EP | 1 535 940 B1 | 6/2005 |
| EP | 1 710 270 A1 | 10/2006 |
| EP | 1 710 280 A1 | 10/2006 |
| EP | 1 896 523 B1 | 3/2008 |
| EP | 2 076 568 B1 | 7/2009 |
| JP | 2004057850 A | 2/2004 |
| JP | 2013076094 A | 4/2013 |
| WO | 2007/063983 A1 | 6/2007 |

* cited by examiner

*Primary Examiner* — Marc Zimmer
(74) *Attorney, Agent, or Firm* — Brooks Kushman P.C.

(57) ABSTRACT

Moisture curable compositions having a low modulus and a high resilience are prepared by curing a composition containing a first polymer which predominately contains two moisture-curable silyl groups, and a second polymer which is terminated by an alkoxy group and contains but a single moisture-curable silyl group, or a hydroxyl group.

18 Claims, No Drawings

CROSS-LINKABLE MASSES BASED ON ORGANYL-OXYSILANE-TERMINATED POLYMERS

CROSS REFERENCE TO RELATED APPLICATIONS

This application is the U.S. National Phase of PCT Appln. No. PCT/EP2014/066824 filed Aug. 5, 2014, which claims priority to German Application No. 10 2013 216 852.7 filed Aug. 23, 2013, the disclosures of which are incorporated in their entirety by reference herein.

BACKGROUND OF THE INVENTION

1. Field of the Invention

The invention relates to crosslinkable compositions based on silane-crosslinking prepolymers, to processes for preparation thereof and to the use thereof as adhesives and sealants.

2. Description of the Related Art

Polymer systems having reactive alkoxysilyl groups have long been known. On contact with water or the humidity of the air, these alkoxysilane-terminated polymers, even at room temperature, are capable of condensing with one another with elimination of the alkoxy groups. One of the most important uses of materials of this kind is the production of sealants and adhesives.

For instance, adhesives and sealants based on alkoxysilane-crosslinking polymers, in the cured state, exhibit not only good bonding properties on some substrates but also very good mechanical properties, since they can be both tear-resistant and highly elastic. Compared to conventional silicone sealants, silane-crosslinking systems additionally have the advantages of overcoatability and lower propensity to soiling.

In many applications, preference is given to one-pack systems which cure on contact with air humidity. The crucial advantage of one-pack systems is, in particular, the very easy applicability thereof, since no mixing of various adhesive components by the user is required.

A particular disadvantage of these systems according to the prior art is the low reactivity of the corresponding MS or SPUR polymers toward moisture, which necessitates aggressive catalysis. The corresponding mixtures therefore typically contain considerable amounts of tin catalysts, which are a matter of toxicological concern.

It is advantageous to use what are called α-silane-terminated prepolymers having reactive alkoxysilyl groups bonded by a methylene spacer to an adjacent urethane unit. This class of compounds is highly reactive and requires neither tin catalysts nor strong acids or bases to achieve high curing rates on contact with air. Commercially available α-silane-terminated prepolymers are GENIOSIL® STP-E10 or STP-E30 from Wacker-Chemie AG.

The standard silane-terminated polymers have a cross-linkable silane function on the majority of their chain ends and thus—if they are based on polymers having a linear backbone—contain two silane functions per molecule.

Especially for low-modulus systems, i.e. sealants having a 100% modulus <0.5 MPa, however, it is advantageous to use polymer systems which, in the cured state, lead to particularly low crosslinking densities. This can be achieved in a particularly simple manner by not exclusively using the abovementioned standard, usually difunctional prepolymers, but rather mixtures of these polymers with polymers having only one crosslinkable silane function per molecule.

Systems of this kind are described, for example, in EP-A 1 710 270, EP-A 1 710 280 or else EP-A 2 076 568.

However, a disadvantage of most standard silane-terminated prepolymer formulations having a comparatively low crosslinking density in the cured state is the fact that they often have only an only moderately good resilience. In other words, these materials exhibit only very incomplete relaxation after prolonged extension. However, it is exactly this property that sealants generally need to have. For example, ISO 11600 requires a resilience exceeding 60% or even 70% for elastic sealants.

The problem of inadequate resilience relates especially to systems based on the abovementioned α-silane-terminated prepolymers that are particularly advantageous in terms of their superior curing properties. The connection between low crosslinking density and low resilience is obvious, since dense crosslinking makes it impossible for the crosslinked polymer chains, even in the stressed state, to move with respect to one another. Permanent deformation, i.e. poor resilience, is thus prevented by a higher crosslinking density. However, higher crosslinking densities inevitably also lead to higher-modulus materials.

SUMMARY OF THE INVENTION

It was thus an object of the invention to develop silane-terminated prepolymers with which low-modulus compositions no longer having the disadvantages of the prior art are obtainable. This object and other objects were surprisingly and unexpectedly achieved, by providing compositions (M) comprising (A) 100 parts by weight of silane-crosslinking polymers of the formula

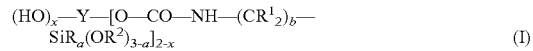

where

Y is a divalent polymer radical,

R may be the same or different and is a monovalent, optionally substituted hydrocarbyl radical, $R^1$ may be the same or different and is a hydrogen atom or a monovalent, optionally substituted hydrocarbyl radical, $R^2$ may be the same or different and is a hydrogen atom or a monovalent, optionally substituted hydrocarbyl radical, x is 0 or 1, a may be the same or different and is 0, 1 or 2, preferably 0, and b may be the same or different and is an integer from 1 to 10, preferably 1, 3 or 4, more preferably 1 or 3, especially 3, with the proviso that component (A) includes less than 15 mol %, preferably less than 10 mol %, more preferably less than 5 mol %, of polymers of the formula (I) with x=1, and (B) 5 to 500 parts by weight of silane-crosslinking polymers of the formula

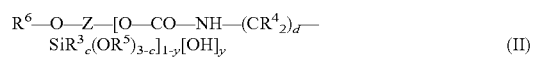

where

Z is a divalent polymer radical having no hydroxyl group, $R^3$ may be the same or different and is a monovalent, optionally substituted hydrocarbyl radical, $R^4$ may be the same or different and is a hydrogen atom or a monovalent, optionally substituted hydrocarbyl radical, $R^5$ may be the same or different and is a hydrogen atom or a monovalent, optionally substituted hydrocarbyl radical, $R^6$ is a monovalent, optionally substituted hydrocarbyl radical, y is 0 or 1, c may be the same or different and is 0, 1 or 2, preferably 1, and d may be the same or different and is an integer from 1 to 10, preferably 1, 3 or 4, more preferably 1 or 3, especially 1, with the proviso that component (B) includes less than 15 mol %, preferably less than 10 mol %, more preferably less than 5 mol %, of polymers of the formula (II) with y=1.

DETAILED DESCRIPTION OF THE PREFERRED EMBODIMENTS

Preferably, the compositions (M), based on 100 parts by weight of polymers (A), include 10 to 100 parts by weight of polymer (B). More preferably, the compositions (M), based on 100 parts by weight of polymers (A), include 25 to 75 parts by weight of polymer (B).

Examples of R and $R^3$ radicals are each independently alkyl radicals such as the methyl, ethyl, n-propyl, isopropyl, 1-n-butyl, 2-n-butyl, isobutyl, tert-butyl, n-pentyl, isopentyl, neopentyl, tert-pentyl radical; hexyl radicals such as the n-hexyl radical; heptyl radicals such as the n-heptyl radical; octyl radicals such as the n-octyl radical, isooctyl radicals and the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl radical and methylcyclohexyl radicals; alkenyl radicals such as the vinyl, 1-propenyl and 2-propenyl radical; aryl radicals such as the phenyl, naphthyl, anthryl and phenanthryl radical; alkaryl radicals such as o-, m-, p-tolyl radicals; xylyl radicals and ethylphenyl radicals; and aralkyl radicals such as the benzyl radical and the α- and β-phenylethyl radicals.

Examples of substituted R and $R^3$ radicals are independently haloalkyl radicals such as the 3,3,3-trifluoro-n-propyl radical, the 2,2,2,2',2',2'-hexafluoroisopropyl radical and the heptafluoroisopropyl radical, and haloaryl radicals such as the o-, m- and p-chlorophenyl radical.

Preferably, the R and $R^3$ radicals are each independently monovalent hydrocarbyl radicals optionally substituted by halogen atoms and having 1 to 6 carbon atoms, more preferably alkyl radicals having 1 or 2 carbon atoms, especially the methyl radical.

Examples of $R^2$ and $R^4$ radicals are each independently a hydrogen atom, or the radicals specified for R.

Preferably, the $R^2$ and $R^4$ radicals are each independently a hydrogen atom or a hydrocarbyl radical having 1 to 20 carbon atoms, especially a hydrogen atom.

Examples of $R^2$ and $R^5$ radicals are independently a hydrogen atom or the examples given for the R radical.

Preferably, the $R^2$ and $R^5$ radicals are each independently a hydrogen atom or an alkyl radical optionally substituted by halogen atoms and having 1 to 10 carbon atoms, more preferably an alkyl radical having 1 to 4 carbon atoms, especially the methyl or ethyl radical.

Examples of $R^6$ radicals are the examples given for the R radical.

Preferably, the $R^6$ radical comprises alkyl radicals optionally substituted by halogen atoms and having 1 to 10 carbon atoms, more preferably alkyl radicals having 1 to 6 carbon atoms, especially the methyl radical, ethyl radical, n-propyl or n-butyl radical.

Examples of polymer radicals Y and Z are independently polyester, polyether, polyurethane, polyalkylene and polyacrylate radicals.

The polymer radicals Y and Z are preferably each independently organic polymer radicals containing, as a polymer chain, polyoxyalkylene such as polyoxyethylene, polyoxypropylene, polyoxybutylene, polyoxytetramethylene, polyoxyethylene-polyoxypropylene copolymer and polyoxypropylene-polyoxybutylene copolymer; hydrocarbon polymers such as polyisobutylene and copolymers of polyisobutylene with isoprene; polychloroprenes; polyisoprenes; polyurethanes; polyesters; polyamides; polyacrylates; polymethacrylates; vinyl polymer and/or polycarbonates.

More preferably, the Y and Z radicals are each polyoxyalkylene radicals, more preferably linear polyoxyalkylene radicals.

The polymers of the formula (I) used in accordance with the invention are preferably prepared by reacting polymers of the formula $$HO-Y-OH \qquad (V)$$

with silanes of the formula $$OCN-(CR^1{}_2)_b-SiR_a(OR^2)_{3-a} \qquad (VI)$$

where all the radicals and indices have one of the definitions given above. What is crucial is that this reaction achieves substantially complete termination of the chain ends present.

The polymers of the formula (II) used in accordance with the invention are preferably prepared by reacting polymers of the formula $$R^6-O-Z-OH \qquad (IV)$$

with silanes of the formula $$OCN-(CR^4{}_2)_b-Si^3R_a(OR^5)_{3-a} \qquad (VII)$$

where all the radicals and indices have one of the definitions given above. What is crucial is that this reaction achieves substantially complete termination of the hydroxyl-functional chain ends present.

The invention is therefore based, in particular, on the surprising finding that polymer systems in which virtually all the OH functions have been substantially completely terminated with isocyanate-functional silanes of the formulae (VI) or (VII) have very good mechanical properties, especially including good resilience in combination with a low modulus.

Suitable processes for preparing a corresponding component (A) and also examples of component (A) itself are described, inter alia, in EP 1 535 940 B1 (paragraphs [0005]-[0025] and examples 1-3 and comparative examples 1-4) or EP 1 896 523 B1 (paragraphs [0008]-[0047]), which form part of the disclosure content of the present application.

Component (B) can be produced by equivalent processes which differ from the processes described in EP 1 535 940 B1 or EP 1 896 523 B1 merely in that the reactants used are monofunctional polyethers of the formula (IV) and the respective stoichiometries of the reactants are adjusted correspondingly.

Preferably, component (B) is produced in the presence of a catalyst (KB). Examples of catalysts (KB) optionally usable are bismuth-containing catalysts, for example catalysts having the trade name Borchi® Kat 22, Borchi® Kat VP 0243 or Borchi® Kat VP 0244 from Borchers GmbH, and also those compounds described below as curing catalysts (F).

If catalysts (KB) are used for production of component (B), preferred amounts are from 0.001 to 5 parts by weight, especially amounts from 0.05 to 1 part by weight, based in each case on 100 parts by weight of component (B).

In the production of component (B), the reactants of the formulae (IV) and (VII) are preferably used in such a molar ratio that, for 1 mol of hydroxyl function, 0.9 to 2.0 mol, preferably 0.95 to 1.6 mol and more preferably 1.0 mol to 1.4 mol of isocyanate groups are used.

The compounds (A) and (B) used in accordance with the invention may be prepared separately and not mixed with one another until the provision of the compositions (M) of the invention. However, they can also be prepared together by reacting a mixture of polyols of the formulae (IV) and (V) together with isocyanate-functional silanes of the formulae (VI) and/or (VII).

The mean molecular weights $M_n$ of the compounds (A) are preferably at least 10,000 g/mol, more preferably at least 11,000 g/mol, and preferably at most 30,000 g/mol, more preferably at most 24,000 g/mol and especially at most 22,000 g/mol.

The mean molecular weights $M_n$ of the compounds (B) are preferably at least 3000 g/mol, more preferably at least 4000 g/mol, and preferably at most 30,000 g/mol, more preferably at most 18,000 g/mol and especially at most 12,000 g/mol.

The number-average molar mass $M_n$ was determined by means of size exclusion chromatography (SEC) against a polystyrene standard, in THF, at 60° C., flow rate 1.2 mL/min and RI detection (refractive index detector) on a Styragel HR3-HR4-HR5-HR5 column set from Waters Corp. USA with an injection volume of 100 µl.

The viscosity of component (A) is preferably at least 0.2 Pas, more preferably at least 1 Pas, and most preferably at least 5 Pas, and preferably at most 700 Pas, more preferably at most 100 Pas, measured in each case at 20° C.

The viscosity of component (B) is preferably at least 0.2 Pas, more preferably at least 1 Pas, and most preferably at least 5 Pas, and preferably at most 700 Pas, more preferably at most 100 Pas, measured in each case at 20° C.

In the context of the present invention, viscosity is determined with a Brookfield rotary viscometer.

The components (A) and (B) used in accordance with the invention may contain just one type of compound of the formula (I) or (II), or else mixtures of different types of compounds of the formula (I) or (II).

If component (A) comprises different types of compounds of the formula (I), preference is given to mixtures containing both compounds having silane end groups in which b=1, $R^4$=H and a=1, and compounds having silane end groups in which b=3, $R^1$=H and a=0.

If component (B) comprises different types of compounds of the formula (II), preference is given to mixtures containing both compounds having silane end groups in which d=1, $R^4$=H and c=1, and compounds having silane end groups in which d=3, $R^4$=H and c=0.

In a particular embodiment, the compositions (M) of the invention contain polymers (A) in which, in at least 70% of all the silane end groups, preferably in at least 90% of all the silane end groups, b=3, $R^1$=H and a=0, and polymers (B) in which, in at least 70% of all the silane end groups, more preferably in at least 90% of all the silane end groups, d=1, $R^4$=H and c=1.

In a further particular embodiment, the compositions (M) of the invention contain polymers (A) in which, in at least 70% of all the silane end groups, preferably in at least 90% of all the silane end groups, b=3, $R^1$=H and a=0, and polymers (B) in which, in at least 70% of all the silane end groups, preferably in at least 90% of all the silane end groups, d=3, $R^4$=H and c=0.

The compounds (A) used in accordance with the invention are commercial products or can be prepared by standard chemical methods. Examples of commercially available compounds (A) are the GENIOSIL® products of the STP-E 10, STP-E 15, STP-E 30 or STP-E 35 types from Wacker Chemie AG.

The compounds (B) used in accordance with the invention can be prepared by standard chemical methods, for example those mentioned above.

The compositions (M) of the invention may comprise, in addition to components (A) and (B), further substances other than components (A) and (B), for example (C) organosilicon compounds not having nitrogen atoms bonded directly to carbonyl groups, (D) fillers, (E) silicone resins, (F) catalysts, (G) adhesion promoters, (H) water scavengers, (I) unreactive plasticizers, (J) additives and (K) admixtures.

The organosilicon compounds (C) not having nitrogen atoms bonded directly to carbonyl groups which are optionally present in the compositions (M) of the invention are preferably organosilicon compounds containing units of the formula

  (III)

in which $R^7$ may be the same or different and is a hydrogen atom or optionally substituted hydrocarbyl radicals, D may be the same or different and is a monovalent, SiC-bonded radical not having nitrogen atoms bonded directly to a carbonyl group, $R^8$ may be the same or different and is a monovalent, optionally substituted, SiC-bonded, nitrogen-free organic radical, e is 0, 1, 2, 3 or 4, preferably 1, f is 0, 1, 2 or 3, preferably 1, 2 or 3, more preferably 2 or 3, and g is 0, 1, 2 or 3, preferably 1 or 0, with the proviso that the sum total of e+f+g is less than or equal to 4 and at least one D radical is present per molecule.

The organosilicon compounds (C) used in accordance with the invention may be either silanes, i.e. compounds of the formula (VIII) with e+f+g=4, or siloxanes, i.e. compounds containing units of the formula (VII) with e+f+g≤3, preferably silanes.

Examples of optionally substituted hydrocarbyl radicals $R^7$ are the examples given for the R radical.

The $R^7$ radicals are preferably a hydrogen atom or a hydrocarbyl radical optionally substituted by halogen atoms and having 1 to 18 carbon atoms, more preferably a hydrogen atom or a hydrocarbyl radical having 1 to 10 carbon atoms, especially the methyl or ethyl radical.

Examples of the $R^8$ radical are the examples given for R.

The $R^8$ radical preferably comprises hydrocarbyl radicals optionally substituted by halogen atoms and having 1 to 18 carbon atoms, more preferably hydrocarbyl radicals having 1 to 5 carbon atoms, especially the methyl radical.

Examples of D radicals are radicals of the formulae $H_2N(CH_2)_3-$, $H_2N(CH_2)_2NH(CH_2)_3-$, $H_2N(CH_2)_2NH(CH_2)_2NH(CH_2)_3-$, $H_3CNH(CH_2)_3-$, $C_2H_5NH(CH_2)_3-$, $C_3H_7NH(CH_2)_3-$, $C_4H_9NH(CH_2)_3-$, $C_5H_{11}NH(CH_2)_3-$, $C_6H_{13}NH(CH_2)_3-$, $C_7H_{15}NH(CH_2)_3-$, $H_2N(CH_2)_4-$, $H_2N$—$CH_2$—$CH(CH_3)$—$CH_2$—, $H_2N(CH_2)_5$—, cyclo-$C_5H_9NH(CH_2)_3$—, cyclo-$C_6H_{11}NH(CH_2)_3$—, phenyl-NH$(CH_2)_3$—, $(CH_3)_2N(CH_2)_3$—, $(C_2H_{15})_2N(CH_2)_3$—, $(C_3H_7)_2N(CH_2)_3$—, $(C_4H_9)_2N(CH_2)_3$, $(C_5H_{11})_2N(CH_2)_3$, $(C_6H_{13})_2N(CH_2)_3$, $(C_7H_{15})_2N(CH_2)_3$—, $H_2N(CH_2)_2$—, $H_2N(CH_2)_2NH(CH_2)$—, $H_2N(CH_2)_2NH(CH_2)_2NH(CH_2)$—, $H_3CNH(CH_2)$—, $C_2H_5NH(CH_2)$—, $C_3H_7NH(CH_2)$—, $C_4H_9NH(CH_2)$—, $C_5H_{11}NH(CH_2)$—, $C_6H_{13}NH(CH_2)$—, $C_7H_{15}NH(CH_2)$—, cyclo-$C_5H_9NH(CH_2)$—, cyclo-$C_6H_{11}NH(CH_2)$—, phenyl-NH$(CH_2)$—, $(CH_3)_2N(CH_2)$—, $(C_2H_5)_2N(CH_2)$—, $(C_3H_7)_2N(CH_2)$—, $(C_4H_9)_2N(CH_2)$—, $(C_5H_{11})_2N(CH_2)$—, $(C_6H_{13})_2N(CH_2)$—, $(C_7H_{15})_2N(CH_2)$—, $(CH_3O)_3Si(CH_2)_3NH(CH_2)_3$—, $(C_2H_5O)_3Si(CH_2)_3NH(CH_2)_3$—, $(CH_3O)_2(CH_3)Si(CH_2)_3NH(CH_2)_3$— and $(C_2H_5O)_2(CH_3)Si(CH_2)_3NH(CH_2)_3$—, and also reaction products of the abovementioned primary amino groups with compounds having epoxy groups or double bonds reactive toward primary amino groups. Preferably, the D radical is the $H_2N(CH_2)_3$—, $H_2N(CH_2)_2NH(CH_2)_3$— or cyclo-$C_6H_{11}NH(CH_2)_3$— radical.

Examples of the silanes of the formula (III) optionally used in accordance with the invention are $H_2N(CH_2)_3$—Si$(OCH_3)_3$, $H_2N(CH_2)_3$—Si$(OC_2H_5)_3$, $H_2N(CH_2)_3$—Si$(OCH_3)_2CH_3$, $H_2N(CH_2)_3$—Si$(OC_2H_5)_2CH_3$, $H_2N(CH_2)_2NH(CH_2)_3$—Si$(OCH_3)_3$, $H_2N(CH_2)_2NH(CH_2)_3$—Si$(OC_2H_5)_3$, $H_2N(CH_2)_2NH(CH_2)_3$—Si$(OCH_3)_2CH_3$, $H_2N(CH_2)_2NH(CH_2)_3$—Si$(OC_2H_5)_2CH_3$, $H_2N(CH_2)_2NH(CH_2)_2NH(CH_2)_3$—Si$(OCH_3)_3$, $H_2N(CH_2)_2NH(CH_2)_2NH(CH_2)_3$—Si$(OC_2H_5)_3$, cyclo-$C_6H_{11}NH(CH_2)_3$—Si$(OCH_3)_3$, cyclo-$CH_{11}NH(CH_2)_3$—Si$(OC_2H_5)_3$, cyclo-$C_6H_{11}NH(CH_2)_3$—Si$(OCH_3)_2CH_3$, cyclo-$CH_{11}NH(CH_2)_3$—Si$(OC_2H_5)_2CH_3$, phenyl-NH$(CH_2)_3$—Si$(OCH_3)_3$, phenyl-NH$(CH_2)_3$—Si$(OC_2H_5)_3$, phenyl-NH$(CH_2)_3$—Si$(OCH_3)_2CH_3$, phenyl-NH$(CH_2)_3$—Si$(OC_2H_5)_2CH_3$, HN$((CH_2)_3$—Si$(OCH_3)_3)_2$, HN$((CH_2)_3$—Si$(OC_2H)_3)_2$ HN$((CH_2)_3$—Si$(OCH_3)_2CH_3)_2$, HN$((CH_2)_3$—Si$(OC_2H_5)_2CH_3)_2$, cyclo-$C_6H_{11}NH(CH_2)$—Si$(OCH_3)_3$, cyclo-$C_6H_{11}NH(CH_2)$—Si$(OC_2H_5)_3$, cyclo-$CH_{11}NH(CH_2)$—Si$(OCH_3)_2CH_3$, cyclo-$C_6H_{11}NH(CH_2)$—Si$(OC_2H_5)_2CH_3$, phenyl-NH$(CH_2)$—Si$(OCH_3)_3$, phenyl-NH$(CH_2)$—Si$(OC_2H_5)_3$, phenyl-NH$(CH_2)$—Si$(OCH_3)_2CH_3$, phenyl-NH$(CH_2)$—Si$(OC_2H_5)_2CH_3$, and also the partial hydrolyzates thereof, preference being given to $H_2N(CH_2)_3$—Si$(OCH_3)_3$, $H_2N(CH_2)_3$—Si$(OC_2H_5)_3$, $H_2N(CH_2)_3$—Si$(OCH_3)_2CH_3$, $H_2N(CH_2)_3$—Si$(OC_2H)_2CH_3$, $H_2N(CH_2)_2NH(CH_2)_3$—Si$(OCH_3)_3$, $H_2N(CH_2)_2NH(CH_2)_3$—Si$(OC_2H_5)_3$, $H_2N(CH_2)_2NH(CH_2)_3$—Si$(OCH_3)_2CH_3$, cyclo-$C_6H_{11}NH(CH_2)_3$—Si$(OCH_3)_3$, cyclo-$CH_{11}NH(CH_2)_3$—Si$(OC_2H_5)_3$ and cyclo-$CH_{11}NH(CH_2)_3$—Si$(OCH_3)_2CH_3$ and the partial hydrolyzates of each, and particular preference to $H_2N(CH_2)_3$—Si$(OCH_3)_3$, $H_2N(CH_2)_3$—Si$(OC_2H_5)_3$, $H_2N(CH_2)_3$—Si$(OCH_3)_2CH_3$, $H_2N(CH_2)_3$—Si$(OC_2H_5)_2CH_3$, $H_2N(CH_2)_2NH(CH_2)_3$—Si$(OCH_3)_3$, $H_2N(CH_2)_2NH(CH_2)_3$—Si$(OCH_3)_2CH_3$, cyclo-$C_6H_{11}NH(CH_2)_3$—Si$(OCH_3)_3$, cyclo-$CH_{11}NH(CH_2)_3$—Si$(OCH_3)_2CH_3$ and the partial hydrolyzates of each.

The organosilicon compounds (C) optionally used in accordance with the invention may also assume the function of a curing catalyst or cocatalyst in the compositions (M) of the invention.

In addition, the organosilicon compounds (C) optionally used in accordance with the invention may act as adhesion promoters and/or as water scavengers.

The organosilicon compounds (C) optionally used in accordance with the invention are commercial products or are preparable by the standard chemical methods.

If the compositions (M) of the invention contain component (C), amounts thereof are preferably 0.01 to 25 parts by weight, more preferably 0.1 to 10 parts by weight, and especially 0.5 to 5 parts by weight, based in each case on 100 parts by weight of component (A). The compositions (M) of the invention preferably contain component (C).

The fillers (D) in the compositions (M) of the invention may be any desired fillers known to date.

Examples of fillers (D) are non-reinforcing fillers, i.e. fillers having a BET surface area of preferably up to 50 m$^2$/g, such as quartz, diatomaceous earth, calcium silicate, zirconium silicate, talc, kaolin, zeolites, metal oxide powders, such as aluminum oxides, titanium oxides, iron oxides or zinc oxides, or the mixed oxides thereof, barium sulfate, precipitated and/or ground chalk which may be either coated or uncoated, gypsum, silicon nitride, silicon carbide, boron nitride, glass and polymer powder, such as polyacrylonitrile powder; reinforcing fillers, i.e. fillers having a BET surface area of more than 50 m$^2$/g, such as fumed silica, precipitated silica, precipitated chalk, carbon black, such as furnace black and acetylene black, and mixed silicon-aluminum oxides of high BET surface area; aluminum trihydroxide, fillers in the form of hollow spheres, such as ceramic microbeads, for example those obtainable under the Zeeospheres™ trade name from 3M Deutschland GmbH in Neuss, Germany, elastic polymer beads, for example those obtainable under the EXPANCEL® trade name from AKZO NOBEL, Expancel in Sundsvall, Sweden, or glass beads; fibrous fillers, such as asbestos and polymer fibers. The fillers mentioned may be hydrophobized, for example by treatment with organosilanes or -siloxanes or with stearic acid, or by etherification of hydroxyl groups to alkoxy groups.

Preferably, the fillers (D) are ground and/or precipitated chalk which may be either coated or uncoated, talc, aluminum trihydroxide and silica, particular preference being given to calcium carbonate and aluminum trihydroxide. Preferred calcium carbonate types are ground or precipitated calcium carbonate, optionally surface-treated with fatty acids such as stearic acid or salts thereof. The preferred silica is preferably fumed silica.

The fillers (D) preferably have a moisture content of preferably less than 1% by weight, more preferably less than 0.5% by weight.

If the compositions (M) of the invention contain fillers (D), the amounts thereof are preferably 10 to 1000 parts by weight, more preferably 50 to 500 parts by weight, and especially 70 to 200 parts by weight, based in each case on 100 parts by weight of constituent (A). The compositions (M) of the invention preferably contain fillers (D).

In a particular embodiment of the invention, the compositions (M) of the invention comprise, as fillers (D), calcium carbonate, aluminum trihydroxide and/or talc or else a combination of a) silica, especially fumed silica, and
b) calcium carbonate, aluminum trihydroxide and/or talc.

In a further preferred embodiment of the invention, the compositions (M) of the invention comprise, as fillers (D), a combination of a) precipitated chalk, and
b) ground chalk.

Any silicone resins (E) present in the compositions (M) of the invention are preferably phenylsilicone resins.

Examples of phenylsilicone resins usable as components (E) are commercial products, for example various SILRES® grades from Wacker Chemie AG, such as SILRES® IC 368, SILRES® IC 678 or SILRES® IC 231 or SILRES® SY231.

If the compositions (M) of the invention contain resins (E), the amounts thereof are at least 5 parts by weight, more preferably at least 10 parts by weight, and especially at least 50 parts by weight and preferably at most 1000 parts by weight, more preferably at most 500 parts by weight, and especially at most 300 parts by weight, based in each case on 100 parts by weight of component (A).

Catalysts (F) used in the compositions (M) of the invention may be any desired catalysts known to date for compositions that cure through silane condensation.

Examples of metal-containing curing catalysts (F) are organic titanium and tin compounds, for example titanic esters such as tetrabutyl titanate, tetrapropyl titanate, tetraisopropyl titanate and titanium tetraacetylacetonate; tin compounds such as dibutyltin dilaurate, dibutyltin maleate, dibutyltin diacetate, dibutyltin dioctanoate, dibutyltin acetylacetonate, dibutyltin oxides, and corresponding dioctyltin compounds.

Examples of metal-free curing catalysts (F) are basic compounds such as triethylamine, tributylamine, 1,4-diazabicyclo[2.2.2]octane, 1,5-diazabicyclo[4.3.0]non-5-ene, 1,8-diazabicyclo[5.4.0]undec-7-ene, N,N-bis(N,N-dimethyl-2-amino-ethyl)methylamine, pentamethylguanidine, tetramethylguanidine and further guanidine derivatives, N,N-dimethylcyclohexylamine, N,N-dimethylphenylamine and N-ethylmorpholine.

It is likewise possible to use, as catalyst (F), acidic compounds, for example phosphoric acid and esters thereof, toluenesulfonic acid, sulfuric acid, nitric acid, or else organic carboxylic acids, for example acetic acid and benzoic acid.

In one embodiment of the invention, catalysts (F) used are metal-containing curing catalysts, preferably tin-containing catalysts. This embodiment of the invention is preferred especially when component (A) consists entirely or at least partly, i.e. to an extent of at least 90% by weight, preferably to an extent of at least 95% by weight, of compounds of the formula (I) in which b is not 1.

If the compositions (M) of the invention contain catalysts (F), the amounts are preferably 0.01 to 20 parts by weight, more preferably 0.05 to 5 parts by weight, based in each case on 100 parts by weight of constituent (A).

The adhesion promoters (G) used in the compositions (M) of the invention may be any desired adhesion promoters described to date for systems that cure through silane condensation.

Examples of adhesion promoters (G) are epoxysilanes such as glycidoxypropyltrimethoxysilane, glycidoxypropylmethyldimethoxysilane, glycidoxypropyltriethoxysilane or glycidoxypropyl-methyldiethoxysilane, 2-(3-triethoxysilylpropyl)maleic anhydride, N-(3-trimethoxysilylpropyl)urea, N-(3-triethoxysilylpropyl)urea, N-(trimethoxysilylmethyl)urea, N-(methyl-dimethoxysilylmethyl)urea, N-(3-triethoxysilylmethyl)urea, N-(3-methyldiethoxysilylmethyl)urea, O-(methylcarbamatomethyl)-methyldimethoxysilane, O-(methylcarbamatomethyl)trimethoxysilane, O-(ethylcarbamatomethyl)methyldiethoxysilane, O-(ethyl-carbamatomethyl)-triethoxysilane, 3-methacryloyloxypropyltrimethoxysilane, methacryloyloxymethyltrimethoxysilane, methacryloyloxymethylmethyldimethoxysilane, methacryloyloxy-methyltriethoxysilane, methacryloyloxymethylmethyldiethoxy-silane, 3-acryloyloxypropyltrimethoxysilane, acryloyloxymethyl-trimethoxysilane, acryloyloxymethylmethyldimethoxysilane, acryloyloxymethyltriethoxysilane and acryloyloxymethyl-methyldiethoxysilane, and the partial condensates thereof.

If the compositions (M) of the invention comprise adhesion promoters (G), the amounts are preferably 0.5 to 30 parts by weight, more preferably 1 to 10 parts by weight, based in each case on 100 parts by weight of component (A). The compositions (M) of the invention preferably contain components (C) and/or (G) as adhesion promoters.

The water scavengers (H) used in the compositions (M) of the invention may be any desired water scavengers described for systems that cure through silane condensation.

Examples of water scavengers (H) are silanes such as vinyltrimethoxysilane, vinyltriethoxysilane, vinylmethyl-dimethoxysilane, O-(methylcarbamatomethyl)methyldimethoxysilane, O-(methylcarbamatomethyl)trimethoxysilane, O-(ethyl-carbamatomethyl)methyldiethoxysilane, and also O-(ethyl-carbamatomethyl)triethoxysilane, and/or the partial condensates thereof, and also orthoesters, such as 1,1,1-trimethoxyethane, 1,1,1-triethoxyethane, trimethoxymethane and triethoxymethane.

If the compositions (M) of the invention comprise water scavengers (H), the amounts are preferably 0.5 to 30 parts by weight, more preferably 1 to 20 parts by weight, based in each case on 100 parts by weight of component (A). The compositions of the invention preferably comprise water scavengers (H).

The unreactive plasticizers (I) used in the compositions (M) of the invention may be any desired plasticizers that are known to date and are typical of silane-crosslinking systems.

Examples of unreactive plasticizers (I) are phthalic esters (e.g. dioctyl phthalate, diisooctyl phthalate and diundecyl phthalate), perhydrogenated phthalic esters (e.g. diisononyl cyclohexane-1,2-dicarboxylate and dioctyl cyclohexane-1,2-dicarboxylate), adipic esters (e.g. dioctyl adipate), benzoic esters, glycol esters, esters of saturated alkanediols (e.g. 2,2,4-trimethylpentane-1,3-diol monoisobutyrate and 2,2,4-trimethylpentane-1,3-diol diisobutyrate), phosphoric esters, sulfonic esters, polyesters, polyethers (e.g. polyethylene glycols and polypropylene glycols preferably having molar masses $M_n$ of 400 to 10 000 g/mol), polystyrenes, polybutadienes, polyisobutylenes, paraffinic hydrocarbons and high molecular weight branched hydrocarbons.

If the compositions (M) of the invention contain unreactive plasticizers (I), the amounts thereof are preferably 0.01 to 100 parts by weight, based on 100 parts by weight of component (A).

In a particularly advantageous embodiment of the invention, the compositions (M) of the invention contain unreactive plasticizers (I).

Additives (J) used in the compositions (M) of the invention may be any desired typical additives useful in silane-crosslinking systems.

The additives (J) used in accordance with the invention are preferably antioxidants, UV stabilizers, for example what are called HALS compounds, fungicides and pigments.

If the compositions (M) of the invention contain additives (J), the amounts are preferably 0.01 to 30 parts by weight, more preferably 0.1 to 10 parts by weight, based in each case on 100 parts by weight of component (A). The compositions (M) of the invention preferably contain additives (J).

The admixtures (K) used in accordance with the invention are preferably tetraalkoxysilanes, for example tetraethoxysilane, and/or partial condensates thereof, plasticizers, reactive plasticizers, rheology additives, flame retardants and organic solvents.

Preferred reactive plasticizers (K) are compounds containing alkyl chains having 6 to 40 carbon atoms and having a group reactive toward the compounds (A). Examples are isooctyltri-methoxysilane, isooctyltriethoxysilane, N-octyltrimethoxy-silane, N-octyltriethoxysilane, decyltrimethoxysilane, decyltriethoxysilane, dodecyltrimethoxysilane, dodecyltriethoxysilane, tetradecyltrimethoxysilane, tetradecyltriethoxysilane, hexadecyltrimethoxysilane and hexadecyltriethoxysilane.

The rheology additives (K) are preferably polyamide waxes, hydrogenated castor oils or stearates.

Examples of organic solvents (K) are low molecular weight ethers, esters, ketones, aromatic and aliphatic and optionally halogenated hydrocarbons and alcohols, preference being given to the latter.

Preferably no organic solvents (K) are added to the compositions (M) of the invention.

If the compositions (M) of the invention contain one or more components (K), the amounts of each are preferably 0.5 to 200 parts by weight, more preferably 1 to 100 parts by weight, especially 2 to 70 parts by weight, based in each case on 100 parts by weight of component (A).

The compositions (M) of the invention contain components (A) and (B) in total concentrations of preferably at most 99% by weight, more preferably at most 95% by weight, and most preferably at most 65% by weight in total, and preferably at least 10% by weight in total, more preferably at least 15% by weight in total, based in each case on the total weight of the composition (M).

Preferably, the compositions (M) of the invention are those comprising
- (A) 100 parts by weight of polymers (A),
- (B) 5 to 500 parts by weight of polymers (B),
- (C) 0.01 to 25 parts by weight of organosilicon compounds not having nitrogen atoms bonded directly to carbonyl groups,
- optionally (D) fillers,
- optionally (E) silicone resins,
- optionally (F) catalysts,
- optionally (G) adhesion promoters,
- optionally (H) water scavengers,
- optionally (I) unreactive plasticizers,
- optionally (J) additives and
- optionally (K) admixtures.

The compositions (M) of the invention are more preferably those comprising
- (A) 100 parts by weight of polymers (A),
- (B) 5 to 500 parts by weight of polymers (B),
- (C) 0.1 to 10 parts by weight of organosilicon compounds not having nitrogen atoms bonded directly to carbonyl groups,
- (D) 10 to 1000 parts by weight of fillers,
- optionally (E) silicone resins,
- optionally (F) catalysts,
- optionally (G) adhesion promoters,
- optionally (H) water scavengers,
- optionally (I) unreactive plasticizers,
- optionally (J) additives and
- optionally (K) admixtures.

In particular, the compositions (M) of the invention are those comprising
- (A) 100 parts by weight of polymers (A),
- (B) 5 to 500 parts of polymers (B),
- (C) 0.1 to 10 parts by weight of organosilicon compounds not having nitrogen atoms bonded directly to carbonyl groups,
- (D) 50 to 500 parts by weight of fillers,
- optionally (E) silicone resins,
- optionally (F) catalysts,
- optionally (G) adhesion promoters,
- optionally (H) water scavengers,
- (I) 0.01 to 100 parts by weight of unreactive plasticizers,
- optionally (J) additives and
- optionally (K) admixtures.

The compositions (M) of the invention preferably do not contain any further constituents apart from components (A) to (K).

The components used in accordance with the invention may each be one kind of such a component or else a mixture of at least two kinds of a particular component.

The compositions (M) of the invention are preferably formulations having viscosities of preferably 500 to 1,000,000 mPas, more preferably of 1000 to 500,000 mPas, especially 5000 to 100,000 mPas, in each case at 25° C.

The compositions (M) of the invention are moisture-curing, meaning that they are preferably liquid or pasty compositions which cure on contact with water and/or atmospheric humidity.

The compositions of the invention (M) can be produced in any manner known per se, for instance by standard methods and mixing processes for production of moisture-curing compositions.

The present invention further provides a process for producing the compositions (M) of the invention by mixing the individual components in any desired sequence.

Preferably, the catalytically active components (C) and (F) are not added until the end of the mixing operation.

This mixing operation can be effected at room temperature, i.e. at temperatures between 0 and 30° C., and pressure of the surrounding atmosphere, i.e. about 900 to 1100 hPa. If desired, this mixing can alternatively be effected at higher temperatures, for example at temperatures in the range from 30 to 130° C. In addition, it is possible to mix intermittently or constantly under reduced pressure, for example at absolute pressures of 30 to 500 hPa, in order to remove volatile compounds and/or air.

The mixing operation of the invention is preferably effected with exclusion of moisture.

The process of the invention can be performed continuously or batchwise.

The compositions (M) of the invention are preferably one-component compositions which are storable with exclusion of water and crosslinkable at room temperature on ingress of water. Alternatively, the compositions (M) of the invention may be part of two-component crosslinking systems, in which OH-containing compounds, such as water, are added in a second component.

The typical water content of air is sufficient for the crosslinking of the compositions (M) of the invention. The compositions (M) of the invention are preferably crosslinked at room temperature. They can, if desired, also be crosslinked at higher or lower temperatures than room temperature, for example at −5 to 15° C. or at 30 to 50° C. and/or by means of concentrations of water exceeding the normal water content of the air.

Preference is given to conducting the crosslinking at a pressure of 100 to 1100 hPa, especially under the pressure of the surrounding atmosphere, i.e. about 900 to 1100 hPa.

The compositions (M) of the invention can be used for all purposes for which crosslinkable compositions based on organosilicon compounds have been used to date, preferably as adhesives or sealants, more preferably as sealants, especially as sealing compounds for joints.

In the case of use of the compositions (M) as sealing compounds for joints, the joints to be sealed may consist of a wide variety of different materials, for example of stone, concrete, mineral substrates, metals, glass, ceramic, wood and painted surfaces or substrates, but also plastics including PVC. In this case, the flanks of the joint may consist either of identical materials or of different materials.

The invention further provides shaped bodies produced by crosslinking the inventive the compositions (M).

The shaped bodies of the invention preferably have a 100% modulus of 0.1-1.4 MPa, more preferably of 0.15-05 MPa.

The shaped bodies of the invention preferably have elongations at break of at least 200%, more preferably of at least 400%, especially of at least 500%.

The shaped bodies of the invention preferably have a resilience of at least 70%.

The shaped bodies of the invention may be any desired shaped bodies, for instance seals, pressed articles, extruded profiles, coatings, impregnations, encapsulations, lenses, prisms, polygonal structures, laminate layers or adhesive layers.

The invention further provides a method for bonding substrates, in which the composition (M) of the invention is applied to the surface of at least one substrate, then this surface is contacted with the second substrate to be bonded, and then left to crosslink.

Examples of substrates which can be bonded in accordance with the invention are concrete, mineral substrates, metals, glass, ceramic and painted surfaces, wood, but also plastics including PVC. It is possible here to bond either identical materials or different materials to one another.

The invention further provides a method of producing material composites, in which the composition of the invention is applied to at least one substrate and then left to crosslink. Examples thereof are coatings and potting compounds, for example for LEDs or other electronic components.

The compositions (M) of the invention have the advantage that they can be used to produce sealants having excellent properties, and have the further advantage that they are easy to produce.

The compositions (M) of the invention have the advantage of featuring a very high storage stability and a high crosslinking rate.

In addition, the compositions (M) of the invention have the advantage of having an excellent adhesion profile.

Furthermore, the crosslinkable compositions (M) of the invention have the advantage of being easy to process.

Furthermore, the crosslinkable compositions (M) of the invention have the advantage that they can be used to obtain shaped bodies, especially sealants, having a low modulus and good resilience.

In the examples described hereinafter, all the viscosities are at a temperature of 25° C. Unless stated otherwise, the examples which follow are conducted at a pressure of the surrounding atmosphere, i.e. at about 1000 hPa, and at room temperature, i.e. at about 23° C., or at a temperature which is established on combination of the reactants at room temperature without additional heating or cooling, and at a relative air humidity of about 50%. In addition, all figures for parts and percentages, unless stated otherwise, are based on weight.

Example 1

Polymer A: Polypropylene Glycol Having a Reactive Silyl Group

A 2000 mL reaction vessel having means of stirring, cooling and heating is initially charged with 1500.0 g (0.3 mol) of a monohydroxy-monobutoxy-terminated polypropylene glycol having a mean molar mass $M_n$ of 5000 g/mol (commercially available as Preminol® S 1005 from AGC Chemicals Europe, LTD, Amsterdam, the Netherlands), which is dried at 80° C. and 1 mbar while stirring for 2 h. Then the mixture is cooled to room temperature and subsequently 58.0 g (0.36 mol) of isocyanatomethylmethyldimethoxysilane (commercially available as GENIOSIL® XL 42 from Wacker Chemie AG, Munich, Germany) are added. The mixture is stirred at 80° C. for 10 min. Thereafter, 0.23 g (150 ppm) of a bismuth-containing catalyst (commercially available as Borchi® Kat 24 from Borchers GmbH, Langenfeld, Germany) is added, and the reaction mixture is heated to 84-85° C. The reaction mixture is stirred at 80° C. for a further 120 min.

Subsequently, the mixture is cooled to 60° C., and 1.92 g (0.06 mol) of methanol are added and the mixture is stirred at 60° C. for a further 30 min. In the resulting polymer mixture, it is no longer possible to detect any isocyanate groups by IR spectroscopy. A clear, transparent polymer mixture is obtained, having a viscosity of 1.5 Pas at 25° C. It can be processed further without any problem.

Example 2

Polymer B: Polypropylene Glycol Having a Reactive Silyl Group

A 2000 mL reaction vessel having means of stirring, cooling and heating is initially charged with 1500.0 g (0.15 mol) of a monohydroxy-monobutoxy-terminated polypropylene glycol having a mean molar mass $M_n$ of 10,000 g/mol (commercially available as Preminol® S 1011 from AGC Chemicals Europe, LTD, Amsterdam, the Netherlands), which is dried at 80° C. and 1 mbar while stirring for 2 h. Then the mixture is cooled to room temperature and subsequently 36.9 g (0.18 mol) of isocyanatopropyltrimethoxysilane (commercially available as GENIOSIL® GF 40 from Wacker Chemie AG, Munich, Germany) are added. The mixture is stirred at 80° C. for 10 min. Thereafter, 0.23 g (150 ppm) of a bismuth-containing catalyst (commercially available as Borchi® Kat 24 from Borchers GmbH, Langenfeld, Germany) is added, and the reaction mixture is heated to approximately 82° C. The reaction mixture is stirred at 80° C. for a further 120 min.

Subsequently, 1.00 g (0.03 mol) of methanol is added and the mixture is stirred at 80° C. for a further 30 min. In the resulting polymer mixture, it is no longer possible to detect any isocyanate groups by IR spectroscopy. A clear, transparent polymer mixture is obtained, having a viscosity of 9.4 Pas at 25° C. It can be processed further without any problems.

Example 3

Production of a Sealant Formulation 20.0 g of polymer B from example 2 are homogenized in a laboratory planetary mixer from PC-Laborsystem, equipped with two beam mixers, at about 25° C. with 30.0 g of a polypropylene glycol having silane termination at both ends and having a mean molar mass $M_n$ of 18,000 g/mol and end groups of the formula —O—C(=O)—NH—(CH$_2$)$_3$—Si(OCH$_3$)$_3$ (commercially available as GENIOSIL® STP-E35 from Wacker Chemie AG, Munich, Germany), 40.0 g of trioctyl trimellitate (commercially available under the Oxsoft TO™ name from OXEA GmbH, Oberhausen, Germany) and 3.0 g of vinyltrimethoxysilane at 200 rpm for 2 minutes.

Thereafter, 105.6 g of a stearic acid-coated calcium carbonate having a median particle diameter (D50%) of about 2.0 μm (commercially available as Omyabond 520 from Omya, Cologne, Germany) are added and digested at 600 rpm while stirring for one minute. Finally, 1.0 g of 3-aminopropyl-trimethoxysilane and 0.4 g of dibutyltin dilaurate are mixed in at 200 rpm and homogenized and stirred under partial vacuum (about 100 mbar) at 200 rpm for 1 minute until free of bubbles.

The composition thus obtained is dispensed into 310 mL PE cartridges and stored at 20° C. for 24 hours prior to examination.

Example 4

Production of a Sealant Formulation

The procedure described in example 3 is repeated, with the difference that 1.0 g of N-(cyclohexyl)-3-aminopropyl-trimethoxysilane is used in place of 1.0 g of 3-aminopropyltrimethoxysilane.

The composition thus obtained is dispensed into 310 mL PE cartridges and stored at 20° C. for 24 hours prior to examination.

Example C5

Comparative

Production of a Sealant Formulation

The procedure described in example 3 is repeated, with the difference that, rather than 20.0 g of polymer B and 30 g of a polypropylene glycol having silane termination at both ends and having a mean molar mass $M_n$ of 18,000 g/mol and end groups of the formula —O—C(=O)—NH—(CH$_2$)$_3$—Si(OCH$_3$)$_3$ (commercially available as GENIOSIL® STP-E35 from Wacker Chemie AG, Munich, Germany), 50 g of the latter component are used.

The composition thus obtained is dispensed into 310 mL PE cartridges and stored at 20° C. for 24 hours prior to examination.

Example C6

(Comparative) Production of a Sealant Formulation

The procedure described in example 3 is repeated, with the difference that, rather than 20.0 g of polymer B and 30 g of a polypropylene glycol having silane termination at both ends and having a mean molar mass $M_n$ of 18,000 g/mol and end groups of the formula —O—C(=O)—NH—(CH$_2$)$_3$—Si(OCH$_3$)$_3$, 50 g of a polypropylene glycol having silane termination at both ends and having a mean molar mass $M_n$ of 18,000 g/mol and end groups of the formula O—C(=O)—NH—(CH$_2$)—Si(CH$_3$)(OCH$_3$)$_2$ (commercially available as GENIOSIL® STP-E30 from Wacker Chemie AG) are used.

The composition thus obtained is dispensed into 310 mL PE cartridges and stored at 20° C. for 24 hours prior to examination.

Example C7

Comparative

Production of a Sealant Formulation

The procedure described in example 3 is repeated, with the difference that, rather than 20.0 g of polymer B, the identical amount of a polypropylene glycol having silane termination at both ends and having a mean molar mass $M_n$ of 18 000 g/mol and end groups of the formula O—C(=O)—NH—(CH$_2$)—Si(CH$_3$)(OCH$_3$)$_2$ (commercially available as GENIOSIL® STP-E30 from Wacker Chemie AG) is used.

The composition thus obtained is dispensed into 310 mL PE cartridges and stored at 20° C. for 24 hours prior to examination.

Example 8

Determination of Profiles of Properties of the Sealants Produced

The sealing compounds obtained in examples 3 to 6 were left to crosslink and examined with respect to skin formation, mechanical properties and resilience. The results can be found in table 1.

Skin Formation Time (SFT)

To determine the skin formation time, the crosslinkable compositions obtained in the examples are applied to PE film in a layer of thickness 2 mm and stored under standard climatic conditions (23° C. and 50% relative air humidity). During the curing, the formation of a skin is checked every 5 min. For this purpose, a dry laboratory spatula is placed cautiously onto the surface of the sample and pulled upward. If sample remains stuck to the spatula, no skin has formed as yet. If no sample sticks to the spatula any more, a skin has formed and the time is noted.

Mechanical Properties

The compositions were each painted onto machined Teflon sheets at a depth of 2 mm and cured at 23° C. and 50% relative air humidity for 2 weeks.

Shore A hardness is determined in accordance with DIN 53505.

Breaking strength is determined in accordance with DIN 53504-S1.

Elongation at break is determined in accordance with DIN 53504-S1.

100% modulus is determined in accordance with DIN 53504-S1.

The 100% modulus in the case of low-modulus sealants should preferably be below 0.5 MPa.

Resilience:

Resilience was measured after preliminary storage of the S2 specimens (DIN 53504) at 23° C., 50% relative air humidity, for 2 and 4 weeks. The test specimens were extended by 30% for 24 h. Resilience was determined after relaxation at 23° C., 50% relative air humidity, for 1 h.

The resilience in the case of low-modulus sealants should preferably be above 70%.

TABLE 1

| | Formulation from example | | | | |
|---|---|---|---|---|---|
| | 3 | 4 | C5 | C6 | C7 |
| Polymer having 2 $Si(OCH_3)_3$— groups [% by wt.] | 15 | 15 | 25 | — | 15 |
| Polymer having 2 $Si(CH_3)(OCH_3)_2$— groups [% by wt.] | — | — | — | 25 | 10 |
| Polymer having 1 $Si(OCH_3)_3$— group [% by wt.] | 10 | 10 | — | — | — |
| Skin formation time [min] | 35 | 80 | 21 | 34 | 15 |
| Shore A hardness | 23 | 16 | 35 | 30 | 43 |
| Elongation at break [%] | 688 | 709 | 544 | 450 | 509 |
| Breaking strength [MPa] | 1.2 | 1.3 | 2.2 | 1.2 | 1.8 |
| 100% modulus [MPa] | 0.39 | 0.27 | 0.80 | 0.61 | 0.89 |
| Resilience [%] | 72 | 75 | 78 | 10 | 55 |

Example 9

Production of a Sealant Formulation and Determination of Mechanical Properties 13 g of polymer A from example 1 are homogenized in a laboratory planetary mixer from PC-Laborsystem, equipped with two beam mixers, at about 25° C. with 46.0 g of a polypropylene glycol having silane termination at both ends and having a mean molar mass $M_n$ of 18,000 g/mol and end groups of the formula —O—C(=O)—NH—$(CH_2)_3$—Si$(OCH_3)_3$ (commercially available as GENIOSIL® STP-E35 from Wacker Chemie AG, Munich, Germany), 60.6 g of a non-silanized polypropylene glycol, i.e. having termination with hydroxyl groups, having a mean molar mass $M_n$ of 2000 g/mol, and 2.0 g of vinyltrimethoxysilane at 200 rpm for 2 minutes.

Thereafter, 63.0 g of a ground natural chalk having a median particle diameter (D50%) of about 5 µm (commercially available as Ulmer Weiß XM from Eduard Merkle GmbH & Co. KG, Blaubeuren, Germany) and 12 g of a fatty acid-coated precipitated chalk having a median particle diameter (D50%) of about 0.07 (commercially available as Hakuenka CCR S10 from Shiraishi Omya GmbH, Gummern, Austria) are added and digested at 600 rpm while stirring for one minute. Finally, 2.0 g of 3-aminopropyltrimethoxysilane, 1.0 g of HALS stabilizer (commercially available as TINUVIN® 123 from BASF SE, Ludwigshafen, Germany; CAS no.: 129757-67-1) and 0.4 g of dibutyltin dilaurate are mixed in at 200 rpm for 1 minute and homogenized and stirred at 200 rpm under partial vacuum (about 100 mbar) for 1 minute until free of bubbles.

The composition thus obtained is dispensed into 310 mL PE cartridges and stored at 20° C. for 24 hours prior to examination.

Skin formation time, mechanical properties and resilience are determined as described in example 8. The results can be found in table 2.

TABLE 2

| Formulation from example | 9 |
|---|---|
| Polymer having 2 $Si(OCH_3)_3$— groups [% by wt.] | 23 |
| Polymer having 1 $Si(CH_3)(OCH_3)_2$— group [% by wt.] | 6.5 |

TABLE 2-continued

| Formulation from example | 9 |
|---|---|
| Skin formation time [min] | 23 |
| Shore A hardness | 19 |
| Elongation at break [%] | 381 |
| Breaking strength [MPa] | 1.2 |
| 100% modulus [MPa] | 0.32 |
| Resilience [%] | 72 |

Example 10

Production of a High-Modulus Adhesive Formulation and Determination of Mechanical Properties 20 g of polymer A from example 1 are homogenized in a laboratory planetary mixer from PC-Laborsystem, equipped with two beam mixers, at about 25° C. with 40.0 g of a polypropylene glycol having silane termination at both ends and having a mean molar mass $M_n$ of 18,000 g/mol and end groups of the formula —O—C(=O)—NH—$(CH_2)_3$—Si$(OCH_3)_3$ (commercially available as GENIOSIL® STP-E35 from Wacker Chemie AG, Munich, Germany) and 3.0 g of vinyltrimethoxysilane at 200 rpm for 2 minutes.

Thereafter, 126.0 g of a ground natural chalk having a median particle diameter (D50%) of about 5 µm (commercially available as Ulmer Weiß XM from Eduard Merkle GmbH & Co. KG, Blaubeuren, Germany) and 8 g of a fatty acid-coated precipitated chalk having a median particle diameter (D50%) of about 0.07 (commercially available as Hakuenka CCR S10 from Shiraishi Omya GmbH, Gummern, Austria) are added and digested at 600 rpm while stirring for one minute. Finally, 2.0 g of N-(2-aminoethyl)-3-aminopropyltrimethoxysilane and 1.0 g of HALS stabilizer (commercially available as TINUVIN® 123 from BASF SE, Ludwigshafen, Germany; CAS no.: 129757-67-1) are mixed in at 200 rpm for 1 minute and homogenized and stirred at 200 rpm under partial vacuum (about 100 mbar) for 1 minute until free of bubbles.

The composition thus obtained is dispensed into 310 mL PE cartridges and stored at 20° C. for 24 hours prior to examination.

Skin formation time, mechanical properties and resilience are determined as described in example 8. The results can be found in table 3.

TABLE 3

| Adhesive formulation from example | 10 |
|---|---|
| Polymer having 2 $Si(OCH_3)_3$— groups [% by wt.] | 20 |
| Polymer having 1 $Si(CH_3)(OCH_3)_2$— group [% by wt.] | 10 |
| Skin formation time [min] | 134 |
| Shore A hardness | 67 |
| Elongation at break [%] | 105 |
| Breaking strength [MPa] | 2.7 |
| 100% modulus [MPa] | 2.7 |

The invention claimed is:

1. A moisture-curable composition comprising:
(A) 100 parts by weight of at least one silane-crosslinking polymer of the formula $$(HO)_x\text{—}Y\text{—}[O\text{—}CO\text{—}NH\text{—}(CR^1{}_2)_b\text{—}SiR_a(OR^2)_{3-a}]_{2-x} \quad (I)$$

where
Y is a divalent polymer radical,
R each, independently, is the same or different and is a monovalent, optionally substituted hydrocarbyl radical,
$R^1$ each, independently, is the same or different and is a hydrogen atom or a monovalent, optionally substituted hydrocarbyl radical,
$R^2$ each, independently, is may be the same or different and is a hydrogen atom or a monovalent, optionally substituted hydrocarbyl radical,
x is 0 or 1,
a each, independently, is the same or different and is 0, 1 or 2
and
b each, independently, is the same or different and is an integer from 1 to 10,
with the proviso that component (A) includes less than 15 mol % of polymers of the formula (I) with x=1,
(B) 5 to 500 parts by weight of at least one silane-crosslinking polymer of the formula

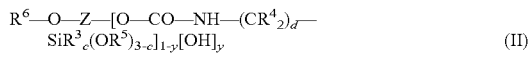  (II)

where
Z is a divalent polymer radical having no hydroxyl group,
$R^3$ each, independently, is the same or different and is a monovalent, optionally substituted hydrocarbyl radical,
$R^4$ each, independently, is the same or different and is a hydrogen atom or a monovalent, optionally substituted hydrocarbyl radical,
$R^5$ each, independently, is the same or different and is a hydrogen atom or a monovalent, optionally substituted hydrocarbyl radical,
$R^6$ each, independently, is monovalent, optionally substituted hydrocarbyl radical,
y is 0 or 1,
c each, independently, is the same or different and is 0, 1 or 2
and
d may be the same or different and is an integer from 1 to 10,
with the proviso that component (B) includes less than 15 mol % of polymers of the formula (II) with y=1, and,
(I) from 0.01 to 100 parts by weight of at least one non-reactive plasticizer, wherein the moisture-curable composition has a resilience of at least 70%, and a 100% modulus of from 0.1 to 0.5 Mpa, following cure.

2. A moisture-curable composition comprising:
(A) 100 parts by weight of at least one silane-crosslinking polymer of the formula

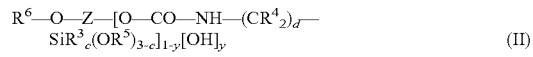  (I)

where
Y is a divalent polymer radical,
R each, independently, is the same or different and is a monovalent, optionally substituted hydrocarbyl radical,
$R^1$ each, independently, is the same or different and is a hydrogen atom or a monovalent, optionally substituted hydrocarbyl radical,
$R^2$ each, independently, is may be the same or different and is a hydrogen atom or a monovalent, optionally substituted hydrocarbyl radical,
x is 0 or 1,
a each, independently, is the same or different and is 0, 1 or 2
and
b each, independently, is the same or different and is an integer from 1 to 10,
with the proviso that component (A) includes less than 15 mol % of polymers of the formula (I) with x=1,
(B) 5 to 500 parts by weight of at least one silane-crosslinking polymer of the formula

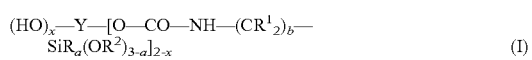  (II)

where
Z is a divalent polymer radical having no hydroxyl group,
$R^3$ each, independently, is the same or different and is a monovalent, optionally substituted hydrocarbyl radical,
$R^4$ each, independently, is the same or different and is a hydrogen atom or a monovalent, optionally substituted hydrocarbyl radical,
$R^5$ each, independently, is the same or different and is a hydrogen atom or a monovalent, optionally substituted hydrocarbyl radical,
$R^6$ each, independently, is monovalent, optionally substituted hydrocarbyl radical,
y is 0 or 1,
c each, independently, is the same or different and is 0, 1 or 2
and
d may be the same or different and is an integer from 1 to 10,
with the proviso that component (B) includes less than 15 mol % of polymers of the formula (II) with y=1, and
(I) from 0.01 to 100 parts by weight of at least one non-reactive plasticizer
wherein at least 70 mol percent of component (A) polymers, b=3, $R^1$=H, and a=0, and in the remaining polymers of component (A), b=1, $R^1$=H, and wherein at least 70 mol percent of component (B) polymers, d=1, $R^4$=H, and c=1, wherein the moisture-curable composition has a resilience of at least 70%, and a 100% modulus of from 0.1 to 0.5 Mpa, following cure.

3. The composition of claim 1, wherein component (A) includes less than 5 mol % of polymers of the formula (I) with x=1.

4. The composition of claim 2, wherein component (A) includes less than 5 mol % of polymers of the formula (I) with x=1.

5. The composition of claim 1, wherein component (B) includes less than 5 mol % of polymers of the formula (II) with y=1.

6. The composition of claim 2, wherein component (B) includes less than 5 mol % of polymers of the formula (II) with y=1.

7. The composition of any of claim 1, wherein the composition contains 10 to 100 parts by weight of polymer (B).

8. The composition of any of claim 2, wherein the composition contains 10 to 100 parts by weight of polymer (B).

9. The composition of claim 1, further comprising at least one organosilicon compound (C) having nitrogen atoms which are not bonded directly to a carbonyl group.

10. The composition of claim 2, further comprising at least one organosilicon compound (C) having nitrogen atoms which are not bonded directly to a carbonyl group.

11. The composition of claim 9, wherein the organosilicon compounds (C) are compounds containing units of the formula

  (III)

where
R⁷ each, independently, is the same or different and is a hydrogen atom or optionally substituted hydrocarbyl radicals,
D each, independently, are the same or different and are monovalent, SiC-bonded radicals having nitrogen atoms which are not a bonded directly to carbonyl group,
R⁸ each, independently, are the same or different and are a monovalent, optionally substituted, SiC-bonded, nitrogen-free organic radicals,
e is 0, 1, 2, 3 or 4,
f is 0, 1, 2 or 3 and
g is 0, 1, 2 or 3,
with the proviso that the sum total of e+f+g is less than or equal to 4 and at least one D radical is present per molecule.

12. The composition of claim 10, wherein the organosilicon compounds (C) are compounds containing units of the formula

   (III)

where
R⁷ each, independently, is the same or different and is a hydrogen atom or optionally substituted hydrocarbyl radicals,
D each, independently, are the same or different and are monovalent, SiC-bonded radicals having nitrogen atoms which are not a bonded directly to carbonyl group,
R⁸ each, independently, are the same or different and are a monovalent, optionally substituted, SiC-bonded, nitrogen-free organic radicals,
e is 0, 1, 2, 3 or 4,
f is 0, 1, 2 or 3 and
g is 0, 1, 2 or 3,
with the proviso that the sum total of e+f+g is less than or equal to 4 and at least one D radical is present per molecule.

13. The composition of claim 1, comprising:
(A) 100 parts by weight of polymer(s) (A),
(B) 5 to 500 parts of polymer(s) (B),
(C) 0.1 to 10 parts by weight of organosilicon compounds not having nitrogen atoms bonded directly to carbonyl groups,
(D) 50 to 500 parts by weight of fillers,
(E) optionally, silicone resins,
(F) optionally, catalysts,
(G) optionally, adhesion promoters,
(H) optionally, water scavengers,
(I) 0.01 to 100 parts by weight of unreactive plasticizers,
(J) optionally, further additives and
(K) optionally, further admixtures,
wherein at least one of (E), (F), (G), (H), (J), or (K) is present.

14. The composition of claim 2, comprising:
(A) 100 parts by weight of polymer(s) (A),
(B) 5 to 500 parts of polymer(s) (B),
(C) 0.1 to 10 parts by weight of organosilicon compounds not having nitrogen atoms bonded directly to carbonyl groups,
(D) 50 to 500 parts by weight of fillers,
(E) optionally, silicone resins,
(F) optionally, catalysts,
(G) optionally, adhesion promoters,
(H) optionally, water scavengers,
(I) 0.01 to 100 parts by weight of unreactive plasticizers,
(J) optionally, further additives and
(K) optionally, further admixtures,
wherein at least one of (E), (F), (G), (H), (J), or (K) is present.

15. A process for producing a composition of claim 1, comprising mixing the individual components in any sequence.

16. A process for producing a composition of claim 2, comprising mixing the individual components in any sequence.

17. A method for bonding substrates, comprising applying a composition of claim 1 to a surface of at least one substrate, and then contacting this surface with a second substrate to be bonded, and allowing the composition to crosslink.

18. A method for bonding substrates, comprising applying a composition of claim 2 to a surface of at least one substrate, and then contacting this surface with a second substrate to be bonded, and allowing the composition to crosslink.

* * * * *

UNITED STATES PATENT AND TRADEMARK OFFICE
CERTIFICATE OF CORRECTION

PATENT NO. : 9,920,229 B2
APPLICATION NO. : 14/904876
DATED : March 20, 2018
INVENTOR(S) : Volker Stanjek et al.

Page 1 of 1

It is certified that error appears in the above-identified patent and that said Letters Patent is hereby corrected as shown below:

In the Claims

Column 19, Line 8, Claim 1:
After "independently, is"
Delete "may be".

Column 19, Line 34, Claim 1:
After "independently, is"
Insert --a--.

Column 19, Line 61, Claim 2:
After "independently, is"
Delete "may be".

Column 20, Line 20, Claim 2:
After "independently, is"
Insert --a--

Signed and Sealed this
Thirty-first Day of July, 2018

Andrei Iancu
*Director of the United States Patent and Trademark Office*